(12) United States Patent
Lee et al.

(10) Patent No.: US 8,624,603 B2
(45) Date of Patent: Jan. 7, 2014

(54) SENSOR ASSEMBLY AND METHODS OF ADJUSTING THE OPERATION OF A SENSOR

(75) Inventors: Yongjae Lee, Niskayuna, NY (US); Boris Leonid Sheikman, Minden, NV (US); Steven Go, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 372 days.

(21) Appl. No.: 12/951,633

(22) Filed: Nov. 22, 2010

(65) Prior Publication Data

US 2012/0126827 A1 May 24, 2012

(51) Int. Cl.
*G01R 27/04* (2006.01)
(52) U.S. Cl.
USPC ............................................. 324/629
(58) Field of Classification Search
USPC .................................... 324/629, 600
See application file for complete search history.

(56) References Cited

U.S. PATENT DOCUMENTS

| | | | |
|---|---|---|---|
| 4,045,727 A | 8/1977 | Yu et al. | |
| 4,313,118 A | 1/1982 | Calvin | |
| 4,346,383 A | 8/1982 | Woolcock et al. | |
| 4,384,819 A | 5/1983 | Baker | |
| 4,525,720 A | 6/1985 | Corzine et al. | |
| 4,652,864 A | 3/1987 | Calvin | |
| 4,845,422 A | 7/1989 | Damon | |
| 4,862,061 A | 8/1989 | Damon | |
| 5,097,227 A | 3/1992 | Yuan et al. | |
| 5,110,216 A * | 5/1992 | Wickersheim et al. | 374/122 |
| 5,227,667 A | 7/1993 | Takinami et al. | |
| 5,334,969 A | 8/1994 | Abe et al. | |
| 5,459,397 A | 10/1995 | Spillman, Jr. | |
| 5,459,405 A | 10/1995 | Wolff et al. | |
| 5,506,515 A | 4/1996 | Godshalk et al. | |
| 5,670,886 A | 9/1997 | Wolff et al. | |
| 5,801,530 A | 9/1998 | Crosby et al. | |
| 5,818,242 A | 10/1998 | Grzybowski et al. | |
| 5,854,994 A | 12/1998 | Canada et al. | |
| 5,963,034 A | 10/1999 | Mahapatra et al. | |
| 5,992,237 A | 11/1999 | McCarty et al. | |
| 6,043,774 A | 3/2000 | Singh et al. | |
| 6,118,287 A | 9/2000 | Boll et al. | |
| 6,227,703 B1 | 5/2001 | DiMatteo et al. | |
| 6,261,247 B1 | 7/2001 | Ishikawa et al. | |
| 6,320,550 B1 | 11/2001 | Van Voorhies | |
| 6,407,562 B1 | 6/2002 | Whiteman | |
| 6,437,751 B1 | 8/2002 | Craven et al. | |

(Continued)

FOREIGN PATENT DOCUMENTS

| | | |
|---|---|---|
| EP | 1942556 A1 | 7/2008 |
| WO | 2007147629 A1 | 12/2007 |
| WO | 2008069750 A1 | 6/2008 |

OTHER PUBLICATIONS

Search Report and Written Opinion from corresponding EP Application No. 11189220.4-2213 dated Mar. 15, 2012.

*Primary Examiner* — Hoai-An D Nguyen
(74) *Attorney, Agent, or Firm* — Jason K. Klindtworth

(57) ABSTRACT

A microwave sensor probe includes a probe housing, an emitter body coupled to the probe housing, and an emitter coupled to the emitter body. The emitter is configured to generate an electromagnetic field from at least one microwave signal. At least one electromagnetic absorbent member is configured to absorb at least one of a current transmitted through the emitter and an electromagnetic radiation generated by the emitter.

20 Claims, 4 Drawing Sheets

(56) References Cited

U.S. PATENT DOCUMENTS

| | | |
|---|---|---|
| 6,445,995 B1 | 9/2002 | Mollmann |
| 6,462,561 B1 | 10/2002 | Bigelow et al. |
| 6,620,057 B1 | 9/2003 | Pirritano et al. |
| 6,750,621 B2 | 6/2004 | Gandrud |
| 6,778,132 B2 | 8/2004 | Palata |
| 6,864,796 B2 | 3/2005 | Lehrman et al. |
| 6,878,147 B2 | 4/2005 | Prakash et al. |
| 6,984,994 B2 | 1/2006 | Gregg |
| 7,073,384 B1 | 7/2006 | Donskoy et al. |
| 7,079,029 B2 | 7/2006 | Tsuji |
| 7,079,030 B2 | 7/2006 | Tsuji |
| 7,119,737 B2 | 10/2006 | Tsuji |
| 7,159,774 B2 | 1/2007 | Woodard et al. |
| 7,176,829 B2 | 2/2007 | Tsuji |
| 7,206,719 B2 | 4/2007 | Lindsay et al. |
| 7,215,111 B2 | 5/2007 | Kaneyasu et al. |
| 7,215,252 B2 | 5/2007 | Schenck |
| 7,250,920 B1 | 7/2007 | Steinbrecher |
| 7,256,376 B2 | 8/2007 | Tsuji |
| 7,274,189 B2 | 9/2007 | Chen et al. |
| 7,318,824 B2 | 1/2008 | Prakash et al. |
| 7,423,934 B1 | 9/2008 | Uzes |
| 7,455,495 B2 | 11/2008 | Leogrande et al. |
| 7,483,800 B2 | 1/2009 | Geisheimer et al. |
| 7,492,165 B2 | 2/2009 | Maier et al. |
| 7,527,623 B2 | 5/2009 | Prakash et al. |
| 7,532,151 B2 | 5/2009 | Touge et al. |
| 7,532,155 B2 * | 5/2009 | Kleman et al. ................ 342/124 |
| 7,541,995 B1 | 6/2009 | Murphy, Jr. |
| 7,554,324 B2 | 6/2009 | Gualtieri |
| 7,604,413 B2 | 10/2009 | Koike et al. |
| 2003/0155934 A1 * | 8/2003 | Moreland et al. ............. 324/629 |
| 2007/0024508 A1 | 2/2007 | Lee |
| 2008/0303513 A1 | 12/2008 | Turner |
| 2009/0102451 A1 | 4/2009 | Kwark |
| 2009/0243915 A1 | 10/2009 | Nishizato et al. |
| 2010/0019038 A1 * | 1/2010 | Puente Baliarda et al. ... 235/439 |
| 2010/0125269 A1 | 5/2010 | Emmons et al. |
| 2010/0211334 A1 | 8/2010 | Sheikman et al. |

\* cited by examiner

SENSOR ASSEMBLY AND METHODS OF ADJUSTING THE OPERATION OF A SENSOR

BACKGROUND OF THE INVENTION

The present application relates generally to power systems and, more particularly, to a sensor assembly and methods of adjusting the operation of a sensor.

Known machines may exhibit vibrations and/or other abnormal behavior during operation. One or more sensors may be used to measure and/or monitor such behavior and to determine, for example, an amount of vibration exhibited in a machine drive shaft, a rotational speed of the machine drive shaft, and/or any other operational characteristic of an operating machine or motor. Often, such sensors are coupled to a machine monitoring system that includes a plurality of monitors. The monitoring system receives signals from one or more sensors, performs at least one processing step on the signals, and transmits the modified signals to a diagnostic platform that displays the measurements to a user.

At least some known machines use eddy current sensors to measure the vibrations in and/or a position of a machine component. However, the use of known eddy current sensors may be limited because a detection range of such sensors is only about half of a width of the eddy current sensing element. Other known machines use optical sensors to measure a vibration and/or a position of a machine component. However, known optical sensors may become fouled by contaminants and provide inaccurate measurements, and as such, may be unsuitable for industrial environments. Moreover, known optical sensors may not be suitable for detecting a vibration and/or a position of a machine component through a liquid medium and/or a medium that includes particulates.

Moreover, at least some known sensors include antennas that have a plurality of antenna arms that radiate outward from a center of the antenna. In such antennas, the impedance of the antenna arms may increase from an inner portion to an outer portion of each antenna arm. Such an impedance change may cause current to be reflected from the outer portion to the inner portion when an electrical signal is transmitted through the antenna. To reduce such current reflections, at least some known antennas are coupled to a ground plane within the antenna. However, the use of such ground planes may increase a damping of the antenna such that an undesirable amount of energy is lost during operation of the antenna.

BRIEF DESCRIPTION OF THE INVENTION

In one embodiment, a microwave sensor probe is provided that includes a probe housing, an emitter body coupled to the probe housing, and an emitter coupled to the emitter body. The emitter is configured to generate an electromagnetic field from at least one microwave signal. At least one electromagnetic absorbent member is configured to absorb at least one of a current transmitted through the emitter and an electromagnetic radiation generated by the emitter.

In another embodiment, a microwave sensor assembly is provided that includes at least one probe. The at least one probe includes a probe housing, an emitter body coupled to the probe housing, and an emitter coupled to the emitter body. The emitter is configured to generate an electromagnetic field from at least one microwave signal. At least one electromagnetic absorbent member is configured to absorb at least one of a current transmitted through the emitter and an electromagnetic radiation generated by the emitter. The microwave sensor assembly also includes a signal processing device coupled to the at least one probe. The signal processing device is configured to generate a proximity measurement based on a loading induced to the emitter.

In yet another embodiment, a method of adjusting an operation of a microwave sensor probe that includes an emitter coupled to an emitter body is provided. The method includes transmitting a microwave signal through the emitter such that an electromagnetic field is generated by the emitter. At least one electromagnetic absorbent member is configured to absorb at least one of a current transmitted through the emitter and an electromagnetic radiation generated by the emitter.

DETAILED DESCRIPTION OF THE INVENTION

Figure 1:
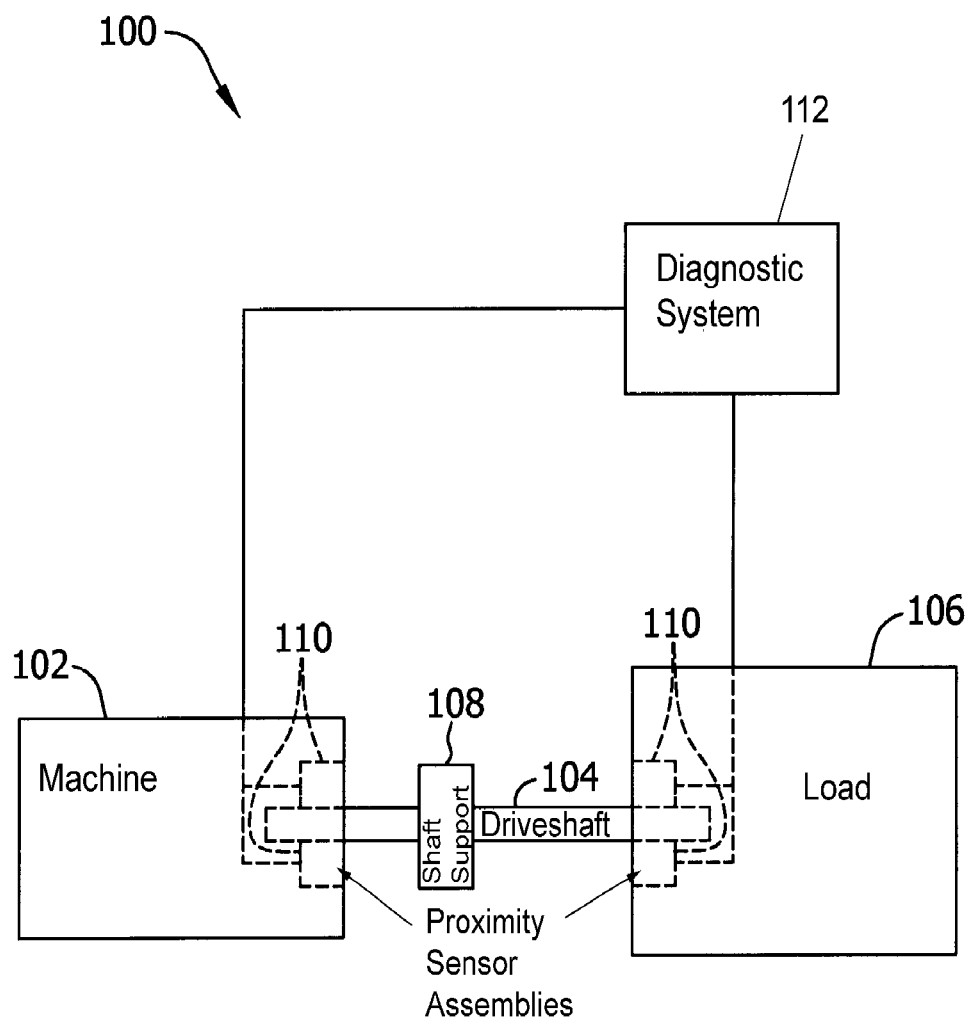
FIG. 1 is a block diagram of an exemplary power system.

FIG. 1 shows an exemplary power system 100 that includes a machine 102. In the exemplary embodiment, machine 102 may be, but is not limited to only being, a wind turbine, a hydroelectric turbine, a gas turbine, or a compressor. Alternatively, machine 102 may be any other machine used in a power system. In the exemplary embodiment, machine 102 rotates a drive shaft 104 coupled to a load 106, such as a generator.

In the exemplary embodiment, drive shaft 104 is at least partially supported by one or more bearings (not shown) housed within machine 102 and/or within load 106. Alternatively or additionally, the bearings may be housed within a separate support structure 108, such as a gearbox, or within any other structure or component that enables power system 100 to function as described herein.

In the exemplary embodiment, power system 100 includes at least one sensor assembly 110 that measures and/or monitors at least one operating condition of machine 102, of drive shaft 104, of load 106, and/or of any other component of power system 100 that enables system 100 to function as described herein. More specifically, in the exemplary embodiment, sensor assembly 110 is a proximity sensor assembly 110 positioned in close proximity to drive shaft 104 for measuring and/or monitoring a distance (not shown in FIG. 1) defined between drive shaft 104 and sensor assembly 110. Moreover, in the exemplary embodiment, sensor assembly 110 uses microwave signals to measure a proximity of a component of power system 100 with respect to sensor assembly 110. As used herein, the term "microwave" refers to a signal or a component that receives and/or transmits signals having one or more frequencies between about 300 megahertz (MHz) and about 300 gigahertz (GHz). Alternatively, sensor assembly 110 may measure and/or monitor any other component of power system 100, and/or may be any other sensor or transducer assembly that enables power system 100 to function as described herein. In the exemplary embodiment, each sensor assembly 110 is positioned in any location within power system 100. Moreover, in the exemplary embodiment, at least one sensor assembly 110 is coupled to a diagnostic system 112 for use in processing and/or analyzing one or more signals generated by sensor assemblies 110.

During operation, in the exemplary embodiment, the operation of machine 102 may cause one or more components of power system 100, such as drive shaft 104, to change position with respect to at least one sensor assembly 110. For example, vibrations may be induced to the components and/or the components may expand or contract as the operating temperature within power system 100 changes. In the exemplary embodiment, sensor assemblies 110 measure and/or monitor the proximity, position, and/or the amount of vibration of the components relative to each sensor assembly 110 and transmit a signal representative of the measured proximity, position, and/or the amount of vibration of the components (hereinafter referred to as a "proximity measurement signal") to diagnostic system 112 for processing and/or analysis.

Figure 2:
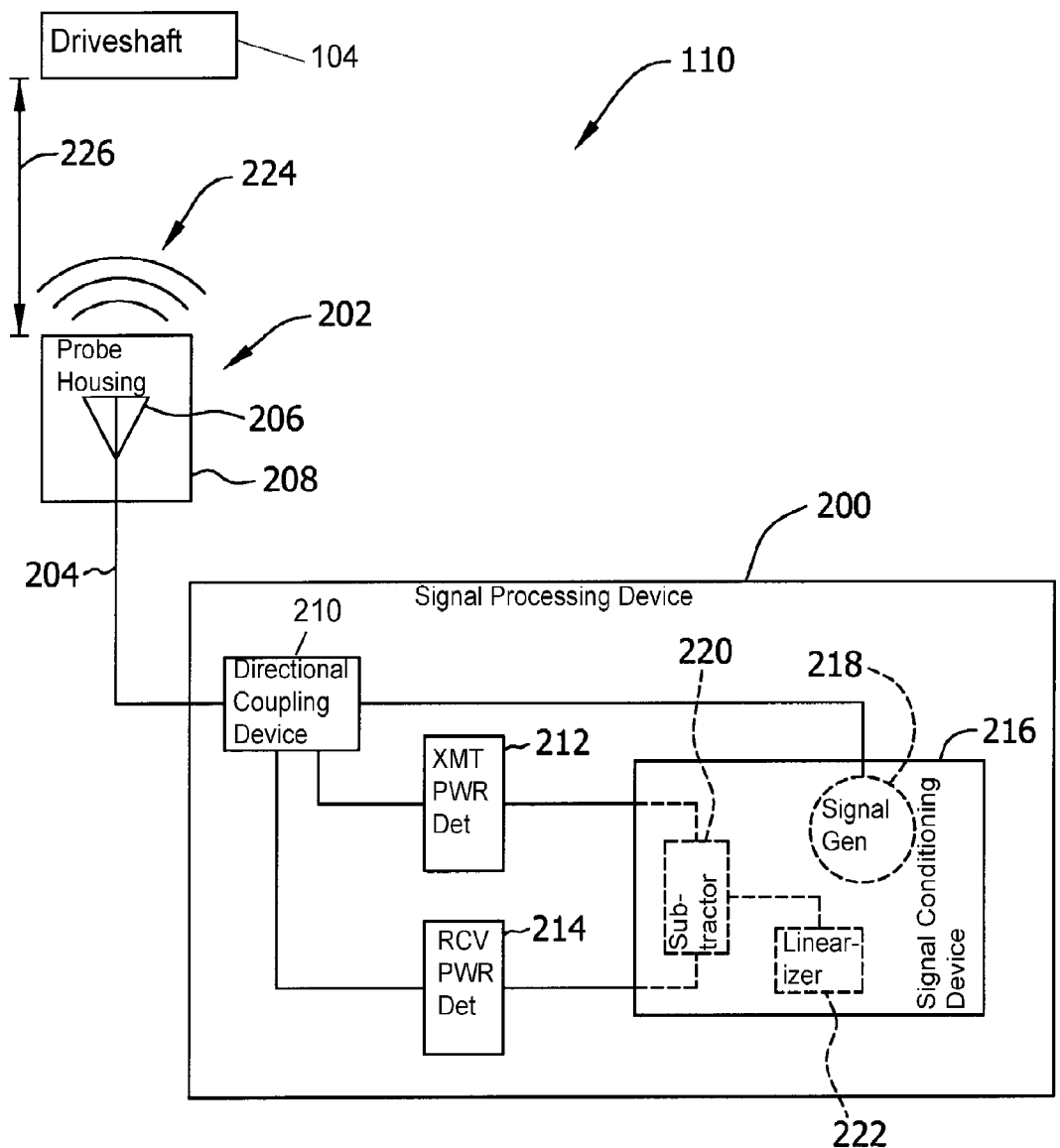
FIG. 2 is a block diagram of an exemplary sensor assembly that may be used with the power system shown in FIG. 1.

FIG. 2 is a schematic diagram of an exemplary sensor assembly 110 that may be used with power system 100 (shown in FIG. 1). In the exemplary embodiment, sensor assembly 110 includes a signal processing device 200 and a probe 202 coupled to signal processing device 200 via a data conduit 204. Moreover, in the exemplary embodiment, probe 202 includes an emitter 206 coupled to and/or positioned within a probe housing 208. More specifically, in the exemplary embodiment, probe 202 is a microwave probe 202 that includes a microwave emitter 206. As such, in the exemplary embodiment, emitter 206 has at least one resonant frequency within a microwave frequency range.

In the exemplary embodiment, signal processing device 200 includes a directional coupling device 210 coupled to a transmission power detector 212, to a reception power detector 214, and to a signal conditioning device 216. Moreover, in the exemplary embodiment, signal conditioning device 216 includes a signal generator 218, a subtractor 220, and a linearizer 222. Emitter 206 emits an electromagnetic field 224 when a microwave signal is transmitted through emitter 206.

During operation, in the exemplary embodiment, signal generator 218 generates at least one electrical signal having a microwave frequency (hereinafter referred to as a "microwave signal") that is equal to or approximately equal to the resonant frequency of emitter 206. Signal generator 218 transmits the microwave signal to directional coupling device 210. Directional coupling device 210 transmits the microwave signal to transmission power detector 212 and to emitter 206. As the microwave signal is transmitted through emitter 206, electromagnetic field 224 is emitted from emitter 206 and out of probe housing 208. If an object, such as a drive shaft 104 or another component of machine 102 (shown in FIG. 1) and/or of power system 100 enters and/or changes a relative position within electromagnetic field 224, an electromagnetic coupling may occur between the object and field 224. More specifically, because of the presence of the object within electromagnetic field 224 and/or because of such object movement, electromagnetic field 224 may be disrupted, for example, because of an induction and/or capacitive effect induced within the object that may cause at least a portion of electromagnetic field 224 to be inductively and/or capacitively coupled to the object as an electrical current and/or charge. In such an instance, emitter 206 is detuned (i.e., a resonant frequency of emitter 206 is reduced and/or changed) and a loading is induced to emitter 206. The loading induced to emitter 206 causes a reflection of the microwave signal (hereinafter referred to as a "detuned loading signal") to be transmitted through data conduit 204 to directional coupling device 210. In the exemplary embodiment, the detuned loading signal has a lower power amplitude and/or a different phase than the power amplitude and/or the phase of the microwave signal. Moreover, in the exemplary embodiment, the power amplitude of the detuned loading signal is dependent upon the proximity of the object to emitter 206. Directional coupling device 210 transmits the detuned loading signal to reception power detector 214.

In the exemplary embodiment, reception power detector 214 determines an amount of power based on and/or contained within the detuned loading signal and transmits a signal representative of the detuned loading signal power to signal conditioning device 216. Moreover, transmission power detector 212 determines an amount of power based on and/or contained within the microwave signal and transmits a signal representative of the microwave signal power to signal conditioning device 216. In the exemplary embodiment, subtractor 220 receives the microwave signal power and the detuned loading signal power, and calculates a difference between the microwave signal power and the detuned loading signal power. Subtractor 220 transmits a signal representative of the calculated difference (hereinafter referred to as a "power difference signal") to linearizer 222. In the exemplary embodiment, an amplitude of the power difference signal is proportional, such as inversely or exponentially proportional, to a distance 226 defined between the object, such as drive shaft 104, within electromagnetic field 224 and probe 202 and/or emitter 206 (i.e., distance 226 is known as the object proximity). Depending on the characteristics of emitter 206, such as, for example, the geometry of emitter 206, the amplitude of the power difference signal may at least partially exhibit a non-linear relationship with respect to the object proximity.

In the exemplary embodiment, linearizer 222 transforms the power difference signal into a voltage output signal (i.e., the "proximity measurement signal") that exhibits a substantially linear relationship between the object proximity and the amplitude of the proximity measurement signal. Moreover, in the exemplary embodiment, linearizer 222 transmits the proximity measurement signal to diagnostic system 112 (shown in FIG. 1) with a scale factor suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein.

Figure 3:
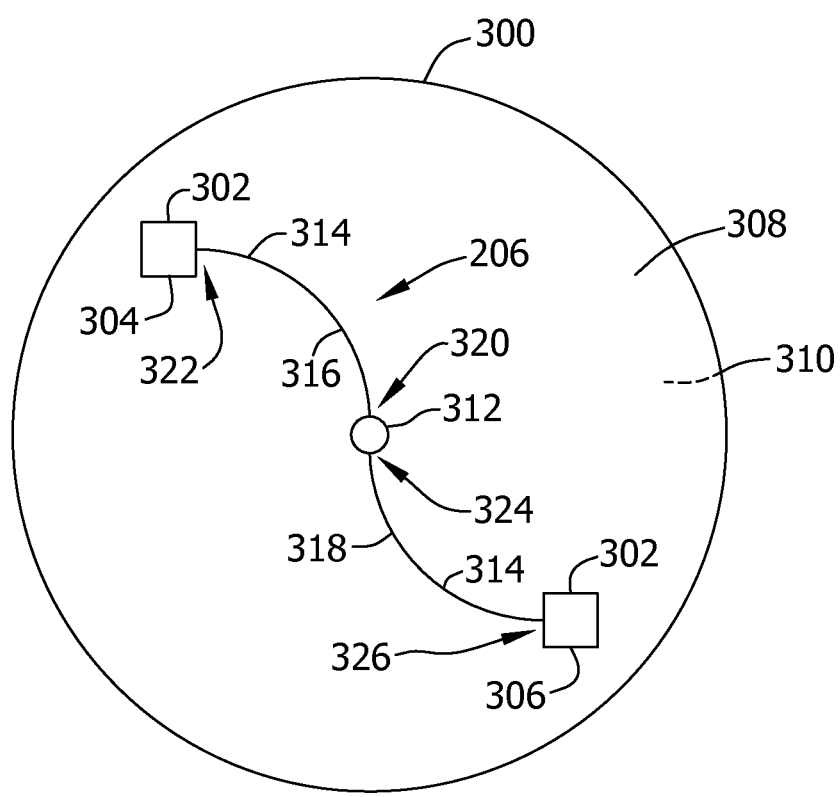
FIG. 3 is a front view of an exemplary emitter body that may be used with the sensor assembly shown in FIG. 2.

FIG. 3 is a front view of an exemplary emitter body 300 that may be used with sensor assembly 110 (shown in FIG. 2). In the exemplary embodiment, emitter body 300 is positioned within, and/or is coupled to, probe housing 208 (shown in FIG. 2). Moreover, in the exemplary embodiment, emitter 206 is coupled to emitter body 300, and at least one electromagnetic absorbent member 302 is positioned relative to, and/or coupled to, probe 202 and/or emitter body 300. More specifically, in the exemplary embodiment, a plurality of members 302 include a first electromagnetic absorbent pad 304 and a second electromagnetic absorbent pad 306.

In the exemplary embodiment, emitter body 300 includes a front surface 308 and an opposing rear surface 310. Emitter 206, in the exemplary embodiment, is coupled to front surface 308 and extends radially outward from a center 312 of front surface 308. More specifically, in the exemplary embodiment, emitter body 300 is a substantially planar printed circuit board, and emitter 206 includes one or more traces or conductors 314 that are formed integrally with, and/or coupled to, front surface 308. Alternatively, emitter 206 and/or emitter body 300 may be configured and/or constructed in any other arrangement that enables sensor assembly 110 to function as described herein.

Moreover, in the exemplary embodiment, conductors 314 form a first arm 316 and a second arm 318 that each extend radially outward from center 312. First arm 316 includes a first end 320 positioned proximate to center 312, and a second end 322 positioned radially outward from center 312. Second arm 318 includes a first end 324 positioned proximate to center 312, and a second end 326 positioned radially outward from center 312. Moreover, in the exemplary embodiment, first arm 316 and second arm 318 are substantially coplanar with front surface 308 such that emitter 206 does not extend a substantial distance axially outward from front surface 308. Alternatively, emitter 206 and/or emitter body 300 may include any number of emitter arms and/or may be any shape that enables microwave sensor assembly 110 to function as described herein.

Emitter body 300, in the exemplary embodiment, includes first electromagnetic absorbent pad 304 and second electromagnetic absorbent pad 306. In the exemplary embodiment, first and second electromagnetic absorbent pads 304 and 306 are manufactured from a dielectric loading material that has a high magnetic permeability. For example, such material may include a plurality of metal fibers entrained within a resin, thermoplastic material, and/or a rubber-based material. Alternatively, first electromagnetic absorbent pad 304 and/or second electromagnetic absorbent pad 306 may be manufactured from any other material that has a layered impedance structure, that has a high dielectric constant, such as greater than about 10, and/or that has a high magnetic permeability, such as greater than about 1. Moreover, in the exemplary embodiment, first and second electromagnetic absorbent pads 304 and 306 are substantially cubical or are rectangular cuboids. First and second electromagnetic absorbent pads 304 and 306 are coupled to second ends 322 and 326, respectively. Alternatively, first and/or second electromagnetic absorbent pads 304 and/or 306 may have any shape, and may be coupled to first arm 316 and/or to second arm 318 at any other position that enables emitter 206 to function as described herein.

In the exemplary embodiment, emitter 206 has a substantially low impedance, such as approximately 50 ohms, proximate to center 312. As first and second arms 316 and 318 extend from center 312, the impedance of arms 316 and 318 increases until a maximum impedance is reached at second ends 322 and 326. In known systems that do not include first and second electromagnetic absorbent pads 304 and 306, an impedance at second ends 322 and 326 may approach infinity. As a result of the changing impedance within emitter 206, at least a portion of a current transmitted through emitter 206 is reflected back from second ends 322 and 326 towards first ends 320 and 324. Accordingly, a standing wave may undesirably be created within emitter 206.

In the exemplary embodiment, coupling first and second electromagnetic absorbent pads 304 and 306 to emitter 206 facilitates reducing the amount of current reflected from second ends 322 and 326. Moreover, first and second electromagnetic absorbent pads 304 and 306 facilitate reducing the effective impedance of emitter 206 at second ends 322 and 326 such that emitter 206 has a more uniform impedance from first ends 320 and 324 to second ends 322 and 326. Accordingly, an increased amount of energy may be concentrated in a center (not shown) of electromagnetic field 224 compared to systems that do not include first and second electromagnetic absorbent pads 304 and 306.

Figure 4:
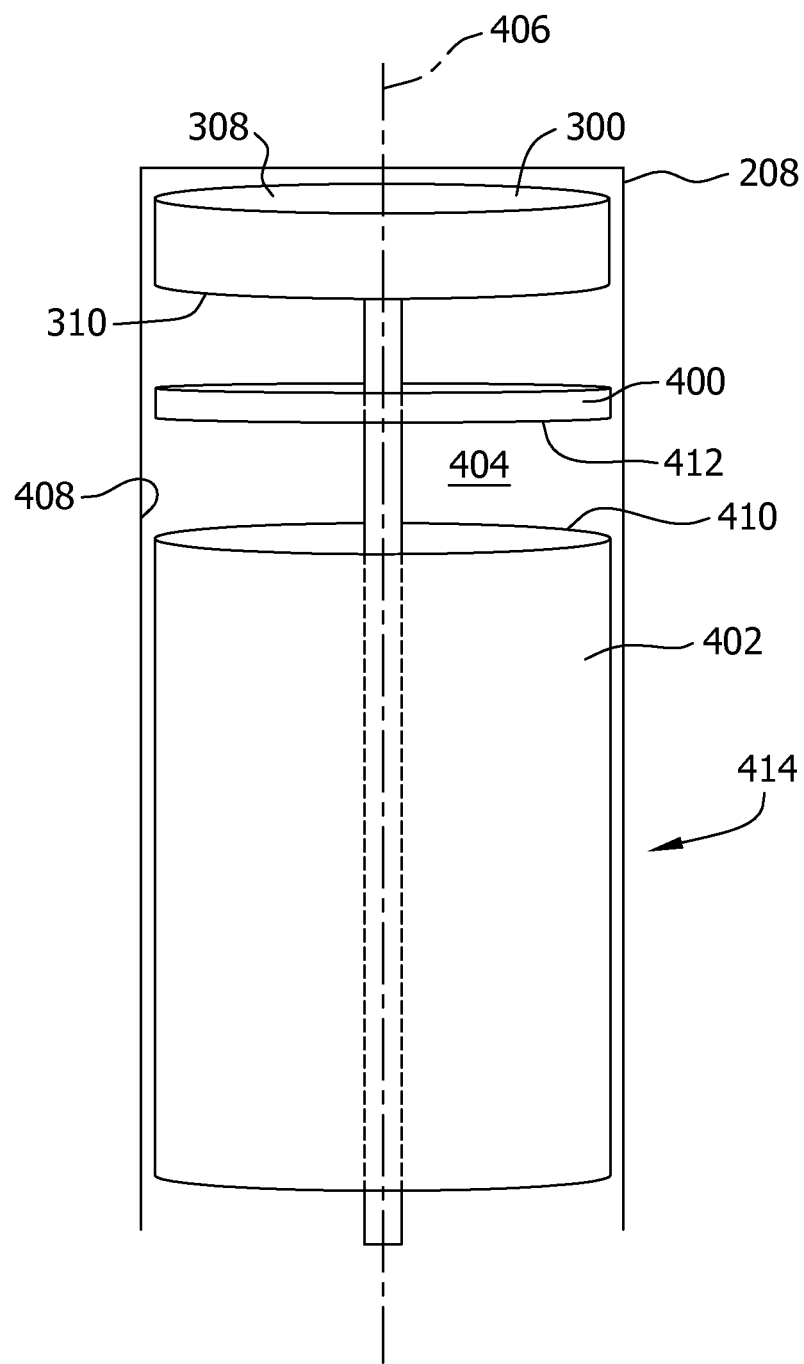
FIG. 4 is a partial cut-away view of an exemplary microwave sensor probe that may be used with the sensor assembly shown in FIG. 2.

FIG. 4 is a partial cut-away view of an exemplary microwave probe 202 that may be used with sensor assembly 110 (shown in FIG. 2). In the exemplary embodiment, probe 202 includes emitter body 300 and emitter 206 including first and second emitter arms 316 and 318 (shown in FIG. 3). Moreover, in the exemplary embodiment, emitter body 300 is coupled to, and/or is positioned within, probe housing 208. Probe housing 208 may be manufactured from a thermoplastic material and/or any other material that enables probe 202 to function as described herein. In the exemplary embodiment, a plurality of electromagnetic absorbent members 302 are positioned relative to, and/or are coupled to, probe 202 and/or emitter body 300. More specifically, members 302 include first electromagnetic absorbent pad 304, second electromagnetic absorbent pad 306 (both shown in FIG. 3), an electromagnetic absorbent disk 400, and/or an electromagnetic absorbent shell 402.

In the exemplary embodiment, a cavity 404 is defined within probe housing 208. Moreover, data conduit 204 extends through cavity 404 substantially along a centerline 406 of probe housing 208. Data conduit 204 is coupled to emitter 206 through rear surface 310 for use in transmitting and receiving signals to and from signal processing device 200 (shown in FIG. 2). In the exemplary embodiment, electromagnetic absorbent disk 400 is substantially circular and is coupled to rear surface 310 such that rear surface 310 is substantially covered by disk 400. Alternatively, disk 400 may be coupled to any portion of rear surface 310 that enables probe 202 to function as described herein. Disk 400, in the exemplary embodiment, at least partially circumscribes data conduit 204 when conduit 204 is coupled to emitter 206.

In the exemplary embodiment, electromagnetic absorbent shell 402 is substantially cylindrical and is coupled to an inner surface 408 of probe housing 208. Electromagnetic absorbent shell 402, in the exemplary embodiment, is positioned about data conduit 204 such that shell 402 circumscribes at least a portion of cavity 404. Alternatively, shell 402 is substantially solid such that shell 402 fills at least a portion of cavity 404. Moreover, in the exemplary embodiment, a downstream annular edge 410 of shell 402 is coupled to rear surface 310. Alternatively, annular edge 410 is coupled to an upstream surface 412 of electromagnetic absorbent disk 400. In the exemplary embodiment, disk 400 and shell 402 are manufactured from the same material as first and second electromagnetic absorbent pads 304 and 306. Alternatively, disk 400 and/or shell 402 may be manufactured from any other dielectric loading material and/or any material that has a layered impedance structure, that has a high dielectric constant, such as greater than about 10, and/or that has a high magnetic permeability, such as greater than about 1.

As used herein, the term "upstream" refers to a direction substantially along centerline 406 from emitter 206 towards a rear portion 414 of probe housing 208. As used herein, the term "downstream" refers to a direction substantially along centerline 406 from rear portion 414 towards emitter 206.

During operation, a microwave signal is transmitted to emitter 206 via data conduit 204. The microwave signal is transmitted through first arm 316 and second arm 318 such that electromagnetic field 224 is emitted. First and second electromagnetic absorbent pads 304 and 306 absorb and/or suppress a current that may be reflected from second ends 322 and 326 towards first ends 320 and 324 (all shown in FIG. 3). As such, an amount of common mode noise that might otherwise be reflected and/or transmitted back from emitter 206 to signal processing device 200 through data conduit 204 is reduced. Electromagnetic absorbent disk 400 and shell 402 facilitate reducing and/or suppressing a portion (not shown) of electromagnetic field 224 that might otherwise radiate upstream from emitter 206, i.e., through cavity 404 and/or through rear portion 414. As such, electromagnetic field 224 is shaped and/or directed substantially downstream from emitter 206. Because an increased amount of microwave energy may be directed downstream from emitter 206, a detection range of sensor assembly 110 may be increased. Moreover, the proximity of an object to emitter 206 may be determined by sensor assembly 110 as described more fully above.

Existing sensor assemblies may be retrofitted with electromagnetic absorbent members 302 to adjust the operation of the sensor assemblies, as described herein. For example, at least one electromagnetic absorbent member 302 may be positioned relative to an emitter body. When a microwave signal is transmitted through the emitter such that an electromagnetic field is generated thereby, the electromagnetic absorbent members 302 may absorb a reflected current transmitted through the emitter and/or absorb a portion of the electromagnetic field that radiates backward (i.e., upstream) from the emitter.

As such, the embodiments described herein overcome the deficiencies of the prior art by providing a more robust proximity sensor. Probe 202 includes first and second electromagnetic absorbent pads 304 and 306 that facilitate reducing and/or suppressing a current reflected through emitter 206. As such, emitter body 300 does not need to include a ground plane to absorb the reflected current. Accordingly, more energy is enabled to be transmitted to electromagnetic field 224 than in prior art systems. Moreover, probe 202 includes an electromagnetic absorbent disk 400 and shell 402 that facilitate reducing and/or suppressing a portion of electromagnetic field 224 that may be directed at least partially upstream from emitter body 300. As such, an increased amount of energy may be concentrated in the downstream portion of electromagnetic field 224 that is directed towards the measured object. Accordingly, a detection range of sensor assembly 110 is facilitated to be increased as compared to prior art systems.

The above-described embodiments provide an efficient and cost-effective sensor assembly for use in measuring the proximity of a machine component to an emitter. The sensor assembly drives the emitter with a microwave signal to generate an electromagnetic field. When an object, such as a machine component, is positioned within the field, a loading is induced to the emitter due to a disruption of the field. The sensor assembly calculates a proximity of the object to the emitter based on the loading induced to the emitter. A plurality of electromagnetic absorbent members are positioned relative to, or are coupled to a probe that houses the emitter. The electromagnetic absorbent members facilitate reducing a current that may be reflected through the emitter, and facilitate reducing a portion of the electromagnetic field that may radiate upstream from the emitter. As such, a detection range and a measurement accuracy of the sensor assembly may be increased.

Exemplary embodiments of a sensor assembly and methods for adjusting the operation of a sensor are described above in detail. The sensor assembly and methods are not limited to the specific embodiments described herein, but rather, components of the sensor assembly and/or steps of the methods may be utilized independently and separately from other components and/or steps described herein. For example, the sensor assembly may also be used in combination with other measuring systems and methods, and is not limited to practice with only the power system as described herein. Rather, the exemplary embodiment can be implemented and utilized in connection with many other measurement and/or monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A microwave sensor probe comprising:
   a probe housing;
   an emitter body coupled to said probe housing;
   an emitter coupled to said emitter body, said emitter configured to generate an electromagnetic field from at least one microwave signal; and
   at least one electromagnetic absorbent member configured to absorb at least one of a current transmitted through said emitter that is reflected back into the emitter from the emitter itself and an electromagnetic radiation generated by said emitter that is reflected back into the emitter from the emitter itself.

2. A microwave sensor probe in accordance with claim 1, wherein said at least one electromagnetic absorbent member comprises at least one electromagnetic absorbent pad coupled to said emitter.

3. A microwave sensor probe in accordance with claim 1, wherein said emitter comprises at least one emitter arm comprising a first end and a second end that extends radially outward from said first end, said at least one electromagnetic absorbent member coupled to said second end.

4. A microwave sensor probe in accordance with claim 1, wherein said emitter comprises:
   a first emitter arm comprising a first end and a second end that extends radially outward from said first emitter arm first end; and
   a second emitter arm comprising a first end and a second end that extends radially outward from said second emitter arm first end.

5. A microwave sensor probe in accordance with claim 4, wherein said at least one electromagnetic absorbent member comprises:
   a first electromagnetic absorbent pad coupled to said first emitter arm second end; and
   a second electromagnetic absorbent pad coupled to said second emitter arm second end.

6. A microwave sensor probe in accordance with claim 1, wherein said emitter body comprises a front surface and a rear surface, said at least one electromagnetic absorbent member comprising at least one electromagnetic absorbent disk coupled to said rear surface.

7. A microwave sensor probe in accordance with claim 1, wherein said at least one electromagnetic absorbent member comprises at least one electromagnetic absorbent shell that at least partially circumscribes a cavity defined within said microwave sensor probe.

8. A microwave sensor assembly comprising:
   at least one probe comprising:
      a probe housing;
      an emitter body coupled to said probe housing;

an emitter coupled to said emitter body, said emitter configured to generate an electromagnetic field from at least one microwave signal; and at least one electromagnetic absorbent member configured to absorb at least one of a current transmitted through said emitter that is reflected back into the emitter from the emitter itself and an electromagnetic radiation generated by said emitter that is reflected back into the emitter from the emitter itself; and a signal processing device coupled to said at least one probe, said signal processing device configured to generate a proximity measurement based on a loading induced to the emitter.

9. A microwave sensor assembly in accordance with claim 8, wherein said at least one electromagnetic absorbent member comprises at least one electromagnetic absorbent pad coupled to said emitter.

10. A microwave sensor assembly in accordance with claim 8, wherein said emitter comprises at least one emitter arm comprising a first end and a second end that extends radially outward from said first end, said at least one electromagnetic absorbent member coupled to said second end.

11. A microwave sensor assembly in accordance with claim 8, wherein said emitter comprises:
a first emitter arm comprising a first end and a second end that extends radially outward from said first emitter arm first end; and
a second emitter arm comprising a first end and a second end that extends radially outward from said second emitter arm first end.

12. A microwave sensor assembly in accordance with claim 11, wherein said at least one electromagnetic absorbent member comprises:
a first electromagnetic absorbent pad coupled to said first emitter arm second end; and
a second electromagnetic absorbent pad coupled to said second emitter arm second end.

13. A microwave sensor assembly in accordance with claim 8, wherein said emitter body comprises a front surface and a rear surface, said at least one electromagnetic absorbent member comprising at least one electromagnetic absorbent disk coupled to said rear surface.

14. A microwave sensor assembly in accordance with claim 8, wherein said at least one electromagnetic absorbent member comprises at least one electromagnetic absorbent shell that at least partially circumscribes a cavity defined within said at least one probe.

15. A method of adjusting an operation of a microwave sensor probe that includes an emitter coupled to an emitter body, said method comprising:
transmitting a microwave signal through the emitter such that an electromagnetic field is generated by the emitter; and
configuring at least one electromagnetic absorbent member to absorb at least one of a current transmitted through the emitter that is reflected back into the emitter from the emitter itself and an electromagnetic radiation generated by the emitter that is reflected back into the emitter from the emitter itself.

16. A method in accordance with claim 15, wherein said configuring at least one electromagnetic absorbent member comprises coupling at least one electromagnetic absorbent pad to the emitter.

17. A method in accordance with claim 15, wherein the emitter includes at least one emitter arm including a first end and a second end that extends radially outward from the first end, said configuring at least one electromagnetic absorbent member comprises coupling at least one electromagnetic absorbent member to the second end.

18. A method in accordance with claim 15, wherein the emitter comprises:
a first emitter arm including a first end and a second end that extends radially outward from the first emitter arm first end; and
a second emitter arm including a first end and a second end that extends radially outward from the second emitter arm first end, and wherein said configuring at least one electromagnetic absorbent member comprises:
coupling a first electromagnetic absorbent pad to the first emitter arm second end; and
coupling a second electromagnetic absorbent pad to the second emitter arm second end.

19. A method in accordance with claim 15, wherein the emitter body includes a front surface and a rear surface, said configuring at least one electromagnetic absorbent member comprises coupling at least one electromagnetic absorbent disk to the rear surface.

20. A method in accordance with claim 15, wherein said configuring at least one electromagnetic absorbent member comprises coupling at least one electromagnetic absorbent shell to the emitter body such that the at least one electromagnetic absorbent shell at least partially circumscribes a cavity defined within the microwave sensor probe.

* * * * *